US010901843B2

(12) United States Patent
Cassano et al.

(10) Patent No.: US 10,901,843 B2
(45) Date of Patent: *Jan. 26, 2021

(54) MANAGING DATA STORAGE (71) Applicant: EMC IP Holding Company LLC, Hopkinton, MA (US)

(72) Inventors: Marc Cassano, Mendon, MA (US); Robert Foley, Clinton, MA (US); Daniel Cummins, Hudson, NJ (US); Socheavy Heng, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,680

(22) Filed: Jun. 5, 2019

(65) Prior Publication Data

US 2019/0286523 A1 Sep. 19, 2019

Related U.S. Application Data (63) Continuation of application No. 14/230,583, filed on Mar. 31, 2014, now Pat. No. 10,353,771.

(51) Int. Cl.
*G06F 11/10* (2006.01)
*G06F 11/36* (2006.01)

(52) U.S. Cl.
CPC .............................. *G06F 11/1076* (2013.01)

(58) Field of Classification Search
None
See application file for complete search history.

(56) References Cited

U.S. PATENT DOCUMENTS 5,513,192 A * 4/1996 Janku .................. G06F 11/1008
714/799
5,737,744 A * 4/1998 Callison .............. G06F 11/1076
711/114

(Continued)

OTHER PUBLICATIONS

Paris et al., Using shared parity disks to improve the reliability of RAID arrays, IEEE, Conference Paper, Pertinent pp. 129-136 (Year: 2009).*

(Continued)

*Primary Examiner* — April Y Blair
*Assistant Examiner* — Dipakkumar B Gandhi
(74) *Attorney, Agent, or Firm* — Krishnendu Gupta; Lesley Leonessa (57) ABSTRACT

Disclosed herein are techniques for use in managing data storage. For example, in one embodiment, the techniques comprise determining a size of the write request. The size of the write request equating to half or more non-parity data portions in a full stripe of data but less than all non-parity data portions in the full stripe. The techniques comprise performing a process based on the size that includes reading a parity and one or more missing non-parity data portions in the full stripe, verifying the coherency of the missing non-parity data portions by comparing a checksum of the parity and a checksum of the missing non-parity data portions, determining a new parity based on the new data and the missing non-parity data portions, and writing, in response to verifying the coherency of the missing non-parity data portions, the new data and the new parity to a RAID group without writing the one or more missing non-parity data portions to the RAID group, wherein the new data and the new parity are written to the RAID group with a checksum.

3 Claims, 6 Drawing Sheets

(56) References Cited

U.S. PATENT DOCUMENTS

| | | | | | |
|---|---|---|---|---|---|
| 5,859,965 | A | * | 1/1999 | Gittins | G06F 11/1076 |
| | | | | | 711/114 |
| 5,884,098 | A | * | 3/1999 | Mason, Jr. | G06F 3/0626 |
| | | | | | 710/1 |
| 6,529,997 | B1 | * | 3/2003 | Debiez | G06F 3/0614 |
| | | | | | 711/114 |
| 6,606,629 | B1 | * | 8/2003 | DeKoning | G06F 11/1076 |
| 6,952,797 | B1 | * | 10/2005 | Kahn | G06F 11/1076 |
| | | | | | 714/758 |
| 10,353,771 | B1 | * | 7/2019 | Cassano | G06F 11/1076 |
| 2009/0113235 | A1 | * | 4/2009 | Selinger | G06F 11/1068 |
| | | | | | 714/6.12 |

OTHER PUBLICATIONS

Lee et al., The Performance of Parity Placements in Disk Arrays, IEEE, vol. 42, No. 6, pp. 651-664 (Year: 1993).*

* cited by examiner

| DATA DRIVES WRITING (N) | 468 TOUCHES | RCW TOUCHES | MR3 TOUCHES |
|---|---|---|---|
| 1 | 4 | 17 | 30 |
| 2 | 6 | 17 | 29 |
| 3 | 8 | 17 | 28 |
| 4 | 10 | 17 | 27 |
| 5 | 12 | 17 | 26 |
| 6 | 14 | 17 | 25 |
| 7 | 16 | 17 | 24 |
| 8 | 18 | 17 | 23 |
| 9 | 20 | 17 | 22 |
| 10 | 22 | 17 | 21 |
| 11 | 24 | 17 | 20 |
| 12 | 26 | 17 | 19 |
| 13 | 28 | 17 | 18 |
| 14 | 30 | 17 | 17 |
| 15 | 32 | 17 | 16 |

FIG. 6A

| DATA DRIVES WRITING (N) | 468 TOUCHES | RCW TOUCHES | MR3 TOUCHES |
|---|---|---|---|
| 1 | 4 | 6 | 8 |
| 2 | 6 | 6 | 7 |
| 3 | 8 | 6 | 6 |
| 4 | 10 | 6 | 5 |

FIG. 6B

| DATA DRIVES WRITING (N) | 468 TOUCHES | RCW TOUCHES | MR3 TOUCHES |
|---|---|---|---|
| 1 | 6 | 9 | 13 |
| 2 | 8 | 9 | 12 |
| 3 | 10 | 9 | 11 |
| 4 | 12 | 9 | 10 |
| 5 | 14 | 9 | 9 |
| 6 | 16 | 9 | 8 |

FIG. 6C

MANAGING DATA STORAGE

RELATED APPLICATION

This application is a continuation of co-pending U.S. patent application Ser. No. 14/230,583, entitled "MANAGING DATA STORAGE", filed on Mar. 31, 2014, which is hereby incorporated herein by reference for all purposes.

FIELD OF THE INVENTION

The present invention relates generally to data storage systems. More particularly, the invention relates to computer-implemented methods, apparatus, and computer program products for managing data storage.

BACKGROUND OF THE INVENTION

Data storage systems may utilize a number of different RAID levels and techniques in connection with providing a combination of fault tolerance and/or improved performance for data storage drives. For example, the first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact. RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

It will be appreciated from the foregoing that techniques for managing data storage in connection with RAID groups can be complex.

It is, therefore, desirable to provide less complex techniques for managing data storage in connection with RAID groups.

SUMMARY OF THE INVENTION

There is disclosed a computer-implemented method, comprising: receiving new data to be written to storage; determining that the new data does not form a full stripe of data; reading missing non-parity data in the stripe of data; based on the new data and the missing non-parity data, determining new parity; and writing the new data and the new parity to storage in a manner that does not require the missing non-parity data to be written to storage.

There is also disclosed an apparatus, comprising: at least one processing device, said at least one processing device comprising a processor coupled to a memory; wherein the apparatus is configured to: receive new data to be written to storage; determine that the new data does not form a full stripe of data; read missing non-parity data in the stripe of data; based on the new data and the missing non-parity data, determine new parity; and write the new data and the new parity to storage in a manner that does not require the missing non-parity data to be written to storage.

There is further disclosed a computer program product having a non-transitory computer-readable medium storing instructions, the instructions, when carried out by one or more processors, causing the one or more processors to perform a method of: receiving new data to be written to storage; determining that the new data does not form a full stripe of data; reading missing non-parity data in the stripe of data; based on the new data and the missing non-parity data, determining new parity; and writing the new data and the new parity to storage in a manner that does not require the missing non-parity data to be written to storage.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
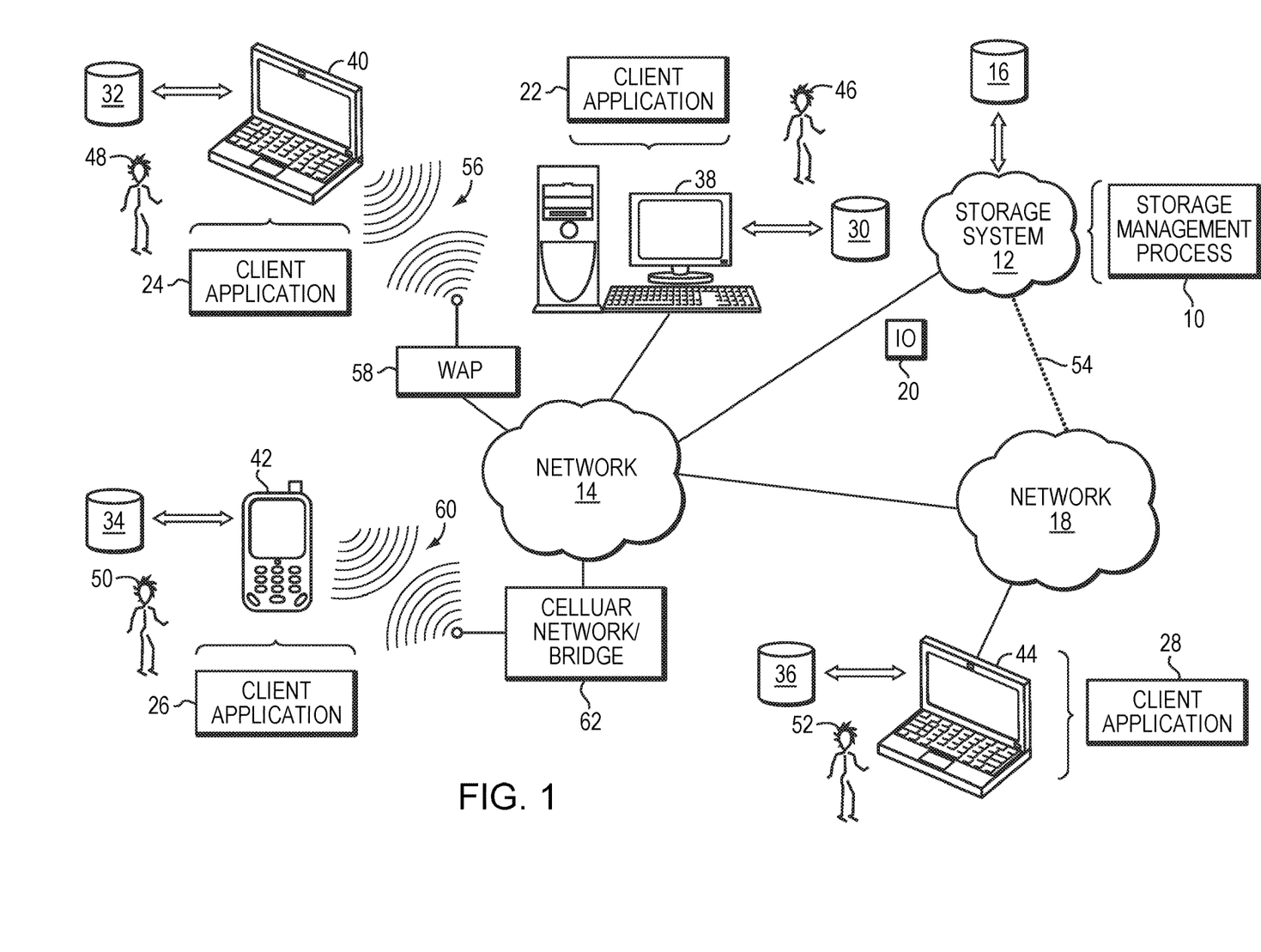
FIG. 1 illustrates a diagrammatic view of a storage system and a storage management process coupled to a distributed computing network.

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
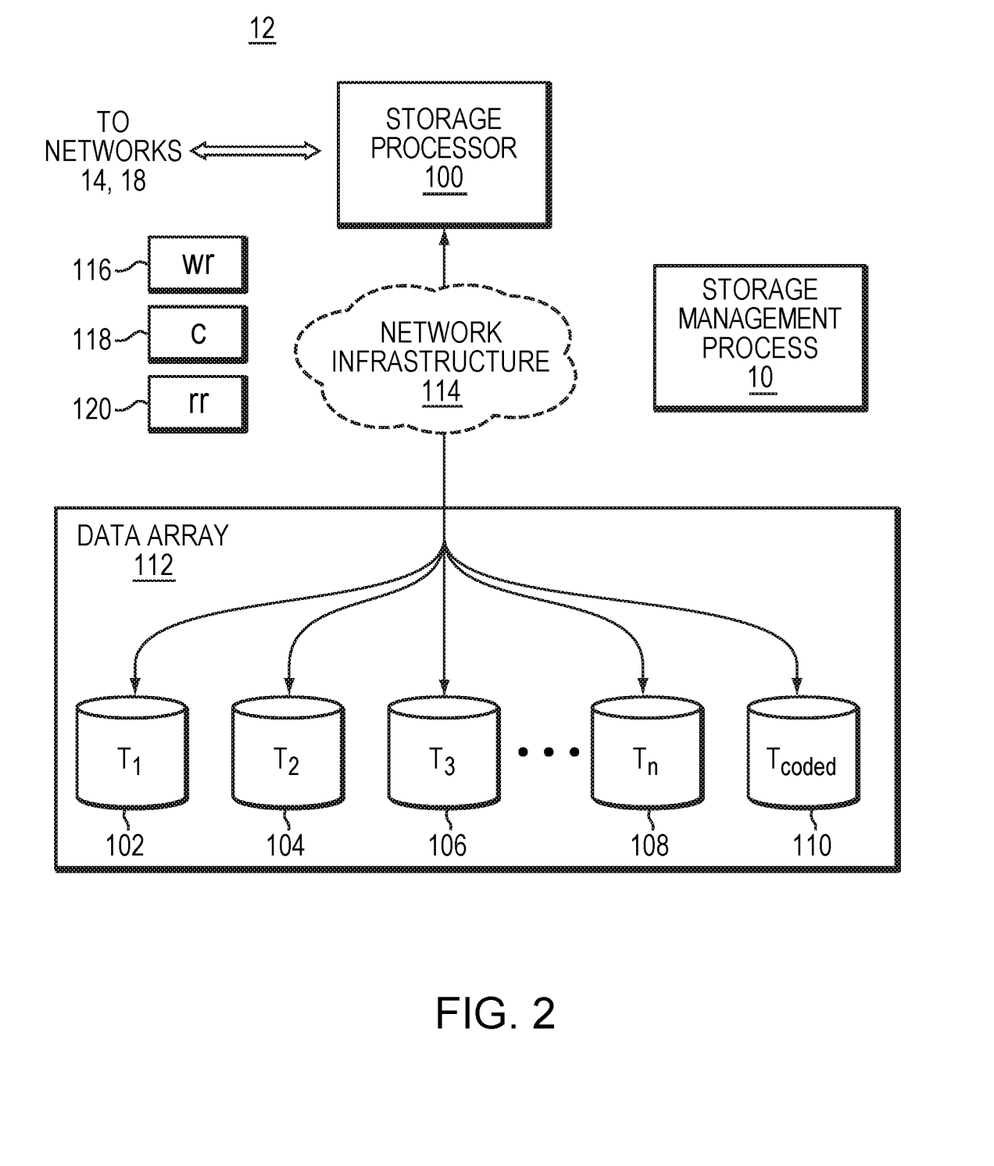
FIG. 2 illustrates a diagrammatic view of the storage system of FIG. 1.

Referring also to FIG. 2, storage system 12 may include storage processor 100 and a plurality of storage targets $T_{1-n}$ (e.g. storage targets 102, 104, 106, 108). Storage targets 102, 104, 106, 108 may be configured to provide various levels of performance and/or high availability. For example, data may be striped across the plurality of storage targets in order to improve performance.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/Flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Figure 3:
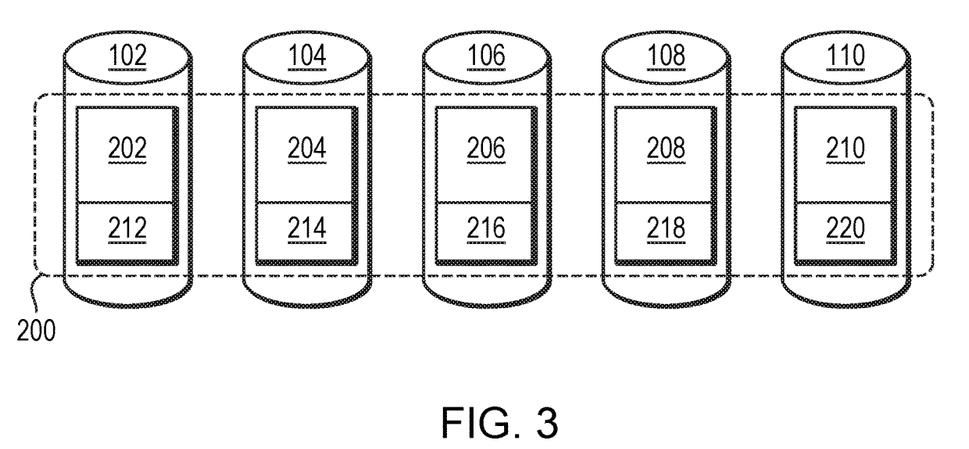
FIG. 3 illustrates a diagrammatic view of the data array of FIG. 2.

Referring also to FIG. 3, when data is stored within storage system 12 by storage management process, this data may be written in data stripes that span across storage targets. For example, data stripe 200 may be written so that (in this example) it spans the five targets, namely storage targets 102, 104, 106, 108 and coded target 110.

Figure 4:
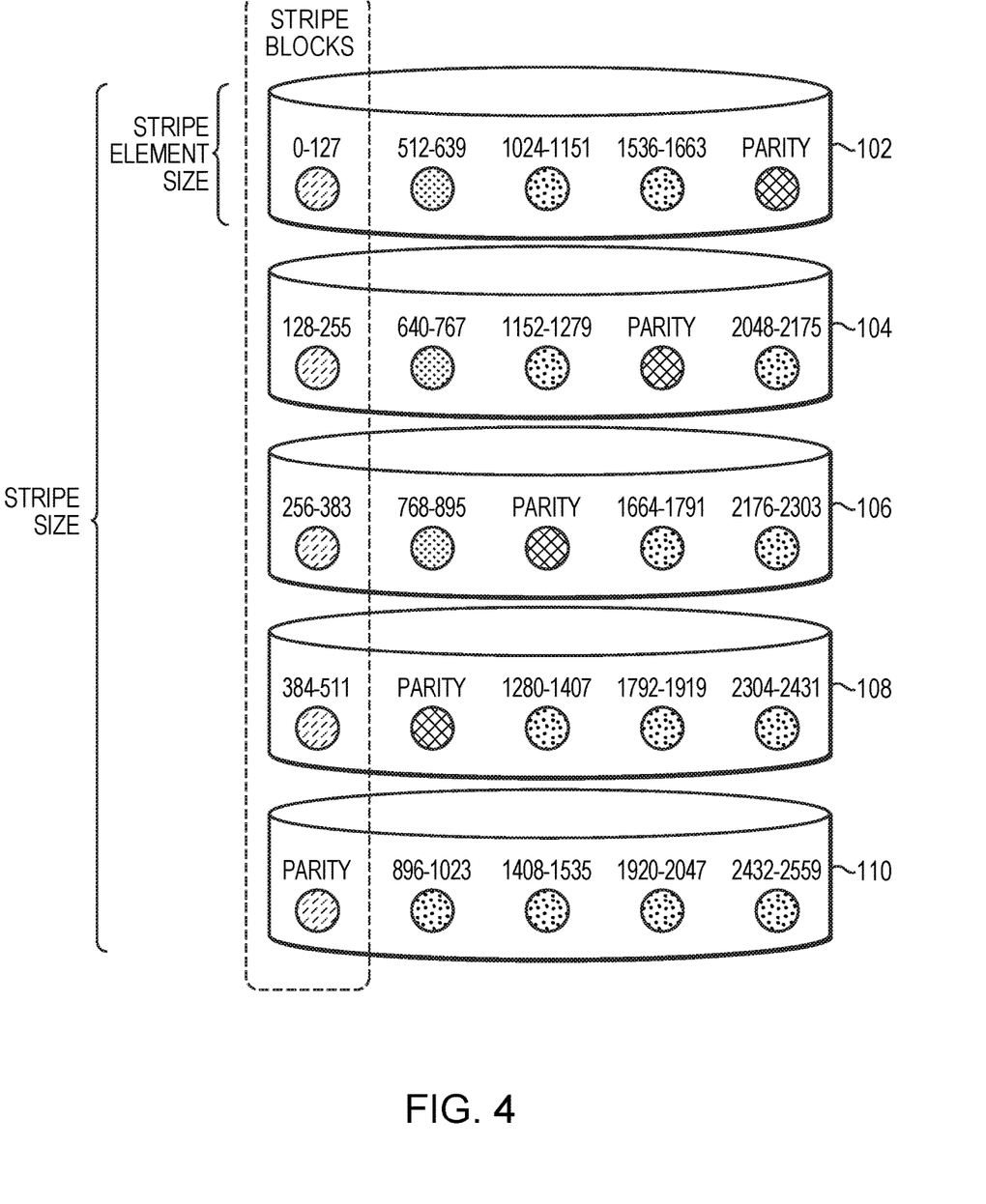
FIG. 4 illustrates another diagrammatic view of the data array of FIG. 2.

Further, while the coded target 110 is discussed above as being the target that contains the parity data, other configurations are possible and are considered to be within the scope of this disclosure. For example, as can be seen in FIG. 4, such parity data may be distributed across multiple targets, wherein no one specific target exclusively functions as the coded target. For example, the parity data for a first data stripe may be stored on target 110; the parity data for a second data stripe may be stored on target 108; the parity data for a third data stripe may be stored on target 106; the parity data for a fourth data stripe may be stored on target 104; and the parity data for a fifth data stripe may be stored on target 102.

Data stripe 200 may include a plurality of portions (e.g., portions 202, 204, 206, 208, 210), wherein one portion is written to each of the storage targets. An example of such portions may include data blocks. For this example, assume that portions 202, 204, 206, 208 are data portions and portion 210 is a parity portion.

When constructing parity portion 210, storage management process 10 may perform an XOR operation on the combination of data portions 202, 204, 206, 208 (e.g., parity portion 210 may be equal to data portion 202 $\oplus$ data portion 204 $\oplus$ data portion 206 $\oplus$ data portion 208). As is known in the art, in the event that a data portion is lost/corrupted/invalid (e.g., one of data portions 202, 204, 206, 208), the parity portion may be utilized to restore the lost/corrupted/invalid data portion. For example, if data portion 202 is lost/corrupted/invalid, data portion 202 may be restored via another XOR operation (e.g., data portion 202=data portion 204 $\oplus$ data portion 206 $\oplus$ data portion 208 $\oplus$ parity portion 210).

Accordingly, as data (e.g., content 118) is written to data array 112, storage management process 10 divides this data into the above-described data portions, from which the above-described parity portion is calculated, and these data portions and parity portion are written as data stripes. Storage management process may also calculate a checksum for each of data portions 202, 204, 206, 208 and parity portion 210. These checksums (e.g., checksums 212, 214, 216, 218, 220) may be appended to/included within data portions 202, 204, 206, 208 and parity portion 210. In the event that one or more of data portions 202, 204, 206, 208 and parity portion 210 are read/retrieved by storage management process, storage management process may first compare these checksums (e.g., checksums 212, 214, 216, 218, 220) to their related portion (e.g., data portions 202, 204, 206, 208 and parity portion 210 respectively) to confirm that the data included within these portions is indeed valid.

Referring to FIG. 4, illustrated are targets 102, 104, 106, 108 and 110 arranged in a RAID5 configuration showing user and parity data with a stripe element size of 128 sectors (65,536 bytes). The stripe size comprises all stripe elements.

Note that the disk block addresses in the stripe proceed sequentially from the first drive to the second, third, and fourth, then back to the first, and so on.

Data is striped across the targets such that the first 128 logical blocks (0-127) are written on the first target 102, the second 128 logical blocks (128-255) are written to the second target 104, and so on. It should be appreciated that a full stripe of data is present if all of the logical blocks are available to fill in a full stripe. For example, the data for logical blocks 0-511 or 1536-2047 would indicate the presence of a full stripe of data.

Figure 5:
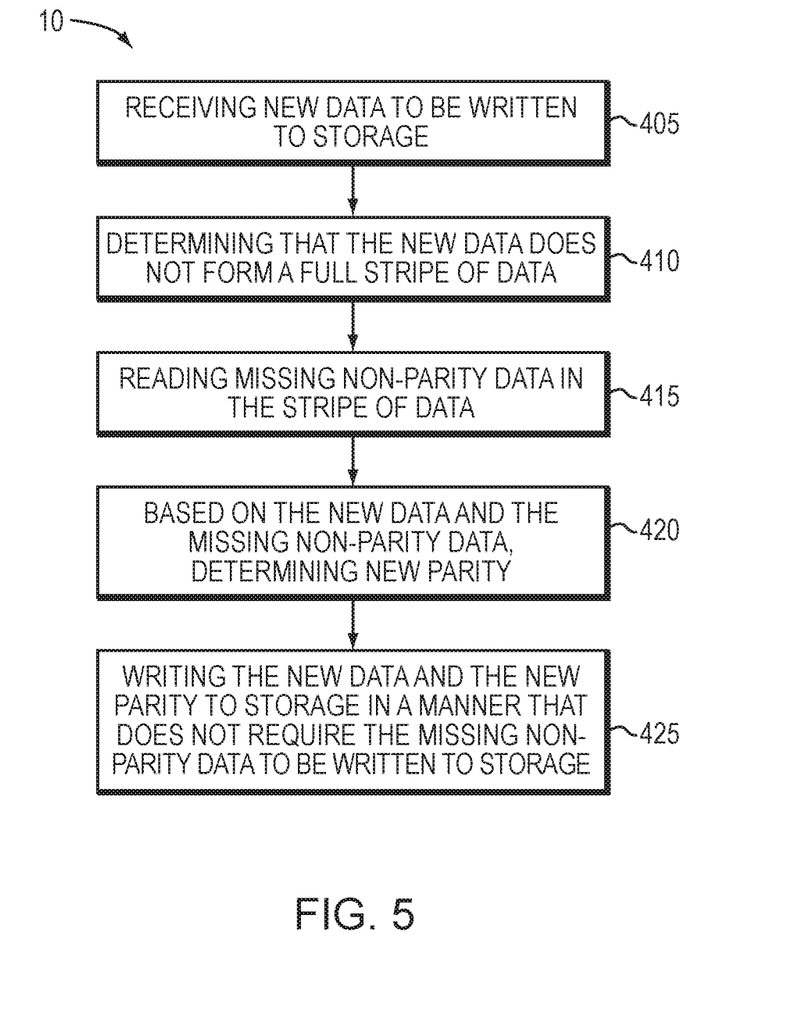
FIG. 5 illustrates a flow chart of one embodiment of the storage management process of FIG. 1.

Referring also to FIG. 5, a flowchart is illustrated of processing steps of one particular embodiment of the storage management process 10 known as the RCW technique. In the flow diagram, the processing steps are summarized in individual blocks. The processing steps may be performed in hardware, or as processor-executable instructions that may be executed by a processor. Furthermore, the processing steps may be performed in many different environments. For example, the processing steps may be performed in the environment of FIG. 1. The below description describes the performance of the processing steps in the environment of FIG. 1.

At step 405, the process comprises receiving new data to be written to storage. For example, a data write request 116 may be received requesting that content 118 or new data be written to storage system 12. At step 410, the process comprises determining that the new data does not form a full stripe of data. For example, a small write operation comprising new data for logical blocks may not form a full stripe of data or a full stripe write. At step 415, the process comprises reading missing non-parity data in the stripe of data. It should be understood that it may be determined to proceed with reading missing non-parity data in the event that the new data is associated with half or more non-parity data portions in the stripe of data and the new data is less than full stripe of data. At step 420, the process comprises determining new parity based on the new data and the missing non-parity data. At step 425, the process comprises writing the new data and the new parity to storage in a manner that does not require the missing non-parity data to be written to storage.

In use, as an example, and with reference to FIGS. 3 and 4, the process may receive a small write operation comprising new data for logical blocks 0-383 that does not form a full stripe of data or a full stripe write. It should be appreciated that new data for logical blocks 0-511 would be required for a full stripe of data. As a result, the process may read logical blocks 384-511 and determine new parity based on the new data for logical blocks 0-383 and the missing non-parity data for logical blocks 384-511. The process may then write the new data and the new parity to appropriate storage and coded targets (102, 104, 106, 110) in a manner that does not require the missing non-parity data to be written to storage target (108).

In another exemplary embodiment, the process may also read parity portion in the stripe of data that comprises a checksum (e.g. 220, etc). It should be understood that the missing non-parity data that is read at step 415 may also have a checksum. As a result, the process may compare the checksum of the parity and the checksum of the missing non-parity data in order to verify the coherency of the missing non-parity data in the stripe of data. If the checksums match then the process writes the new data and the new parity to storage with each having a new checksum.

Figure 6A:
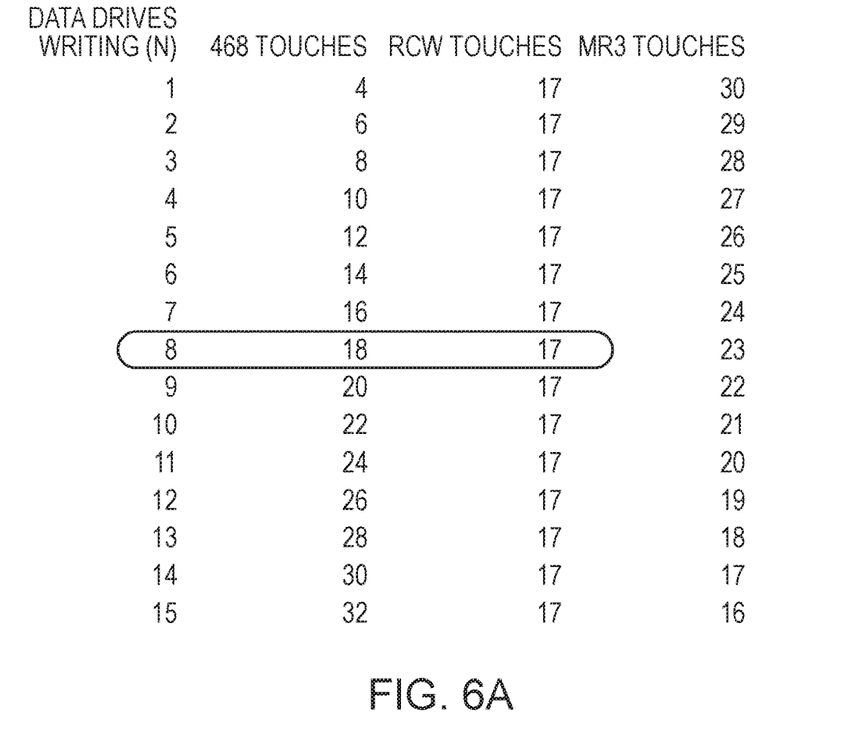
FIG. 6A-6C illustrates tables showing the number of drives touches in connection with different embodiments of the storage management process of FIG. 1.
Figure 6B:
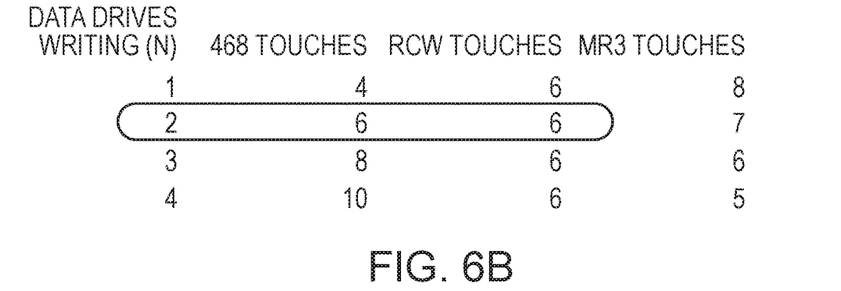
Figure 6C:
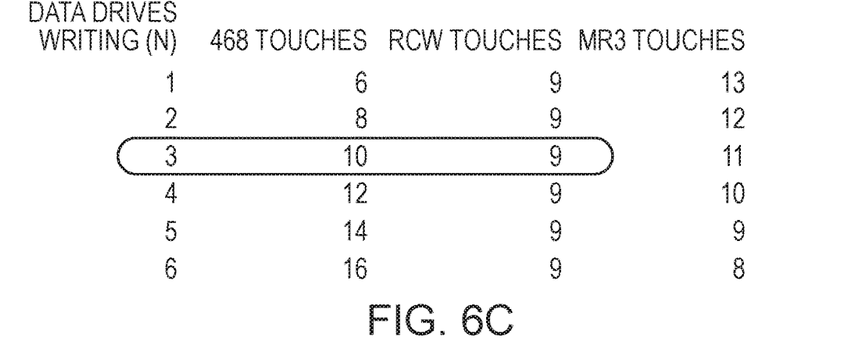

Storage management process 10 may utilize a number of different techniques in connection with managing data storage in connection with RAID configurations. For example, the storage management process may utilize different techniques in connection with a small write request 116 that comprises content 118 to be written to system 12. The process, usually, determines which technique to choose based on the number of drive touches in connection with performing the write operations. FIG. 6A-6C illustrates tables showing the number of drive touches in connection with the different techniques or implementations of the process 10.

Storage management process 10 may utilize a first technique called a read modify write technique (hereinafter '468 technique') by pre-reading old data and parity, removing the old data from parity, adding the new data to parity, and writing out both the new data and parity. The number of drive touches for this technique can be determined as shown below.

468 Technique
   Pre-Reads=N+P
   Writes=N+P
   Total drive touches=2 (N+P)
N=number of data portions in parity RAID group associated with new data
P=number of parity portions in parity RAID group Storage management process 10 may also utilize a second technique (hereinafter 'MR3 technique') by upgrading a small write to a full stripe write by pre-reading the missing data and write a full stripe with calculated parity. The number of drive touches for this technique can be determined as shown below.

MR3 Technique
   Pre-Reads=W−N
   Writes=W+P
   Total drive touches=2W−N+P
W=number of data portions in parity RAID group
N=number of data portions in parity RAID group associated with new data
P=number of parity portions in parity RAID group Storage management process 10 may also utilize a third technique (hereinafter 'RCW technique') as described with respect to FIG. 5. The number of drive touches for this technique can be determined as shown below.

RCW Technique
   Pre-Reads=W−N+1
   Writes=N+P
   Total touches=W+1+P
W=number of data portions in parity RAID group
N=number of data portions in parity RAID group associated with new data
P=number of parity portions in parity RAID group FIG. 6A shows the number of drives touches for each of the three techniques in connection with a RAID5 (15+1) configuration. It will be appreciated that in such a configuration W equals fifteen and P equals one. As can be seen, the 468 technique is the most efficient of the techniques for small writes (i.e., less than a full stripe write) when the number of non-parity data portions in the stripe that are associated with new data is seven or less (i.e., N equals seven or less). The RCW technique as described with respect to FIG. 5 is more efficient when the number of data portions in the stripe that are associated with new data is between eight and thirteen (i.e., N equals a number greater or equals to eight and less than or equals to thirteen). It should be understood that the RCW technique is also more efficient when the number of data portions in the stripe that are associated with new data is fourteen (i.e., N equals fourteen)

as it has less writes than the MR3 technique. The MR3 technique is more efficient when there is a full stripe of data (i.e., N equals fifteen).

FIG. 6B shows the number of drives touches for each of the three techniques in connection with a RAID5 (4+1) configuration. It will be appreciated that in such a configuration W equals four and P equals one. As can be seen, the 468 technique is the most efficient of the techniques for small writes (i.e., less than a full stripe write) when N the number of data portions in the stripe that are associated with new data is one. The RCW technique is more efficient when N the number of data portions in the stripe that are associated with new data is two or three. Note that the 468 and RCW techniques are equal when N equals two but the RCW is able to verify the coherency of the missing data so is deemed more efficient. The MR3 technique is more efficient when there is a full stripe of data (i.e., N equals four).

FIG. 6C shows the number of drives touches for each of the three techniques in connection with a RAID6 (6+2) configuration. It will be appreciated that in such a configuration W equals six and P equals two. As can be seen, the 468 technique is the most efficient of the techniques for small writes (i.e., less than a full stripe write) when N the number of data portions in the stripe that are associated with new data is one or two. The RCW technique is more efficient when N the number of data portions in the stripe that are associated with new data is three, four or five. The MR3 technique is more efficient when there is a full stripe of data (i.e., N equals six).

As discussed above, the storage management process 10 is configured to use the RCW technique when new data is less than full stripe of data and new data is associated with half or more non-parity data portions in the stripe of data. If W equals an odd number then the RCW technique will not be used in connection when half but the next rounded number (e.g., FIG. 6A). If W equals an even number then the RCW technique will be used at half (e.g., FIGS. 6B and 6C).

Advantageously, the RCW technique is more efficient for small writes that are greater than or equal to half the non-parity data portions in the RAID group. The RCW technique uses less bandwidth and fewer writes than current upgrades to full stripe writes. Also, by avoiding re-writing pre-read data, there is less chance of data loss from interrupted writes. Furthermore, in the case of incomplete/interrupted writes, less work is required in our current system to verify that the resultant RAID stripes are left in a coherent state.

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, comprising:
   receiving a write request comprising new data to be written to a data storage system, wherein the data storage system comprises a plurality of data storage devices arranged in a redundant array of independent disks (RAID) group;
   in response to receiving the write request, determining a size of the write request, wherein the size of the write request equates to half or more non-parity data portions in a full stripe of data but less than all of the non-parity data portions in the full stripe of data; and
   based on the size of the write request, performing a process, comprising: reading a parity and one or more missing non-parity data portions in the full stripe of data; verifying the coherency of the one or more missing non-parity data portions by comparing a checksum of the parity and a checksum of the one or more missing non-parity data portions; determining a new parity based on the new data and the one or more missing non-parity data portions; and writing, in response to verifying the coherency of the missing non-parity data portions, the new data and the new parity to the RAID group in the data storage system without writing the one or more missing non-parity data portions to the RAID group in the data storage system, wherein the new data and the new parity are written to the RAID group with a checksum.

2. An apparatus, comprising:
   memory; and
   processing circuitry coupled to the memory, the memory storing instructions which, when executed by the processing circuitry, cause the processing circuitry to:
   receive a write request comprising new data to be written to a data storage system, wherein the data storage system comprises a plurality of data storage devices arranged in a redundant array of independent disks (RAID) group;
   in response to receiving the write request, determine a size of the write request, wherein the size of the write request equates to half or more non-parity data portions in a full stripe of data but less than all of the non-parity data portions in the full stripe of data; and
   based on the size of the write request, perform a process, comprising: reading a parity and one or more missing non-parity data portions in the full stripe of data; verifying the coherency of the one or more missing non-parity data portions by comparing a checksum of the parity and a checksum of the one or more missing non-parity data portions; determining a new parity based on the new data and the one or more missing non-parity data portions; and writing, in response to verifying the coherency of the missing non-parity data portions, the new data and the new parity to the RAID group in the data storage system without writing the one or more missing non-parity data portions to the RAID group in the data storage system, wherein the new data and the new parity are written to the RAID group with a checksum.

3. A computer program product having a non-transitory computer readable medium which stores a set of instructions, the set of instructions, when carried out by processing circuitry, causing the processing circuitry to perform a method of:
   receiving a write request comprising new data to be written to a data storage system, wherein the data storage system comprises a plurality of data storage devices arranged in a redundant array of independent disks (RAID) group;
   in response to receiving the write request, determining a size of the write request, wherein the size of the write request equates to half or more non-parity data portions in a full stripe of data but less than all of the non-parity data portions in the full stripe of data; and
   based on the size of the write request, performing a process, comprising: reading a parity and one or more missing non-parity data portions in the full stripe of data; verifying the coherency of the one or more missing non-parity data portions by comparing a checksum of the parity and a checksum of the one or more missing non-parity data portions; determining a new parity based on the new data and the one or more missing non-parity data portions; and writing, in response to verifying the coherency of the missing non-parity data portions, the new data and the new parity to the RAID group in the data storage system without writing the one or more missing non-parity data portions to the RAID group in the data storage system, wherein the new data and the new parity are written to the RAID group with a checksum.

* * * * *